Figure 1:
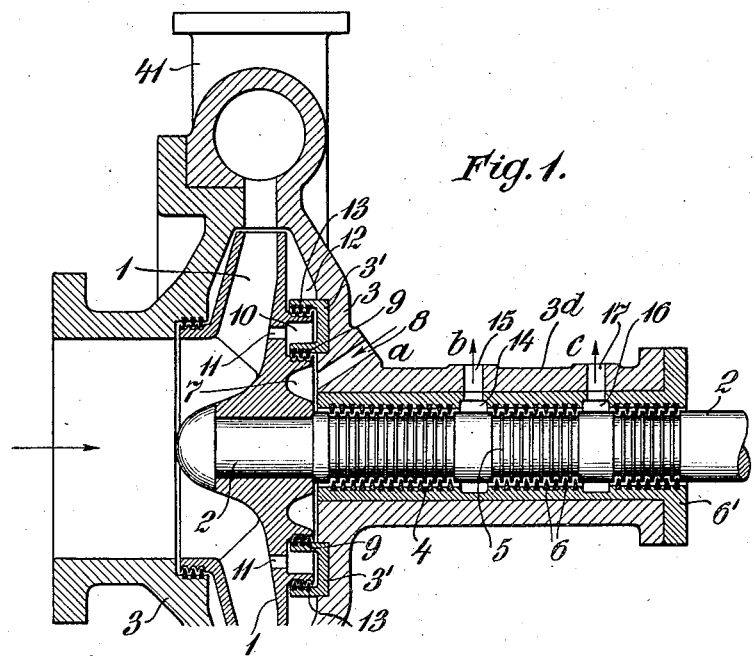

Aug. 11, 1936.   W. BEYER   2,050,259

MULTISTAGE STEAM POWER PLANT SYSTEM

Original Filed July 24, 1931

INVENTOR.

Wilhelm Beyer.

By William C. Linton
Attorney.

Patented Aug. 11, 1936

2,050,259

UNITED STATES PATENT OFFICE 2,050,259

MULTISTAGE STEAM POWER PLANT SYSTEM

Wilhelm Beyer, Moscow, Russia

Original application July 24, 1931, Serial No. 553,017. Divided and this application September 16, 1933, Serial No. 689,776. In Germany July 24, 1930

4 Claims. (Cl. 60—64)

This application is a division of my copending application, Serial No. 553,017, filed July 24, 1931, now Patent No. 1,986,706.

This invention relates to a labyrinth packing for use in steam power plants for sealing against the pressure of saturated steam, especially plants using high-pressure saturated steam. A feature of my invention is that a closure or seal formed by superheated steam in a chamber is arranged in series with the members constituting the labyrinth packing, the arrangement being such, that this packing contains not saturated steam but superheated steam. It is suited to the purpose to separate the space containing the superheated steam employed as closure or seal from the pressure space to be packed or sealed by means of an intermediate packing in order to ensure the sealing action of the superheated steam, and to avoid the necessity of limiting the pressure of this steam either to a certain definite pressure or to narrow limits of pressure. The source of the superheated steam is preferably so chosen that the pressure of the superheated steam is a little higher than the pressure in the pressure space to be packed or sealed. If superheated steam of a higher pressure is not available, steam with a somewhat lower pressure may be used as sealing steam without a perceptible diminution of the effect. Said intermediate packing must be dimensioned corresponding to the ratio of the pressures existing in the pressure space and the sealing space for the superheated steam. This ratio must, under proper circumstances, also be regulated with respect to the temperature of the sealing steam, if it should be possible to choose steam having a certain distinct temperature.

I am aware of the fact that the use of separate sealing means in connection with stuffing boxes and with labyrinth packings is known. There have been designed, for instance, packings for use in connection with a fluid with a high temperature in which cold water is used as means for preventing a detrimental action due to the effects of temperature and changes of temperature. Stuffing boxes which are provided for the packing of spaces under vacuum, for instance the suction spaces of pumps, so as to prevent atmospheric air from entering into the respective spaces, are always provided with a liquid seal, or a sealing liquid. In the case of labyrinth packings for those spaces of steam turbines in which the pressure is below atmospheric pressure, steam with a pressure slightly above atmospheric pressure is used as sealing fluid.

With the known devices the temperature of the sealing fluid is always low. This fluid may be different from that in the space to be sealed or packed, as is the case, for instance, with spaces under vacuo, or it may be a fluid of the same kind or nature, but in another phase. In contra-distinction thereto, the present invention consists in combining with a labyrinth packing intended for the sealing of saturated steam under a higher pressure than atmospheric pressure, a separate sealing space containing superheated steam, the sealing fluid being, thus, in this case the same as that to be sealed or packed and also its phase being the same, but the temperature of the first mentioned fluid being considerably higher than in known devices. In any case, especially as regards high-pressure steam plants, a considerable reduction of the losses by leakage steam, as well as a reduction of the corrosions and erosions in the labyrinth-forming members, is attained. Furthermore, owing to the better quality of the leakage steam, it is rendered possible to utilize this steam considerably more advantageously.

Figure 2:
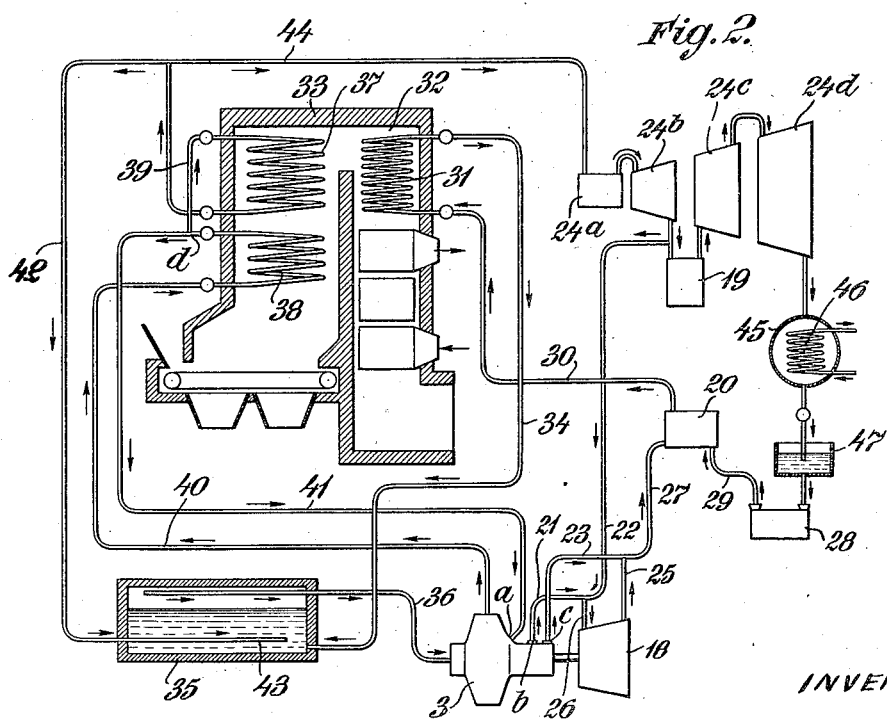

In order to make my invention more clear, I refer to the accompanying drawing in which a constructional form thereof is shown diagrammatically and by way of example, and on which Figure 1 is an axial section through a labyrinth packing designed according to this invention, together with parts of a steam-circulation pump, and Figure 2 is a representation of a complete plant, in which said pump with its labyrinth packing forms one of the operating main parts. Concerning this plant I refer to the United States Patent No. 1,740,254, to Stephan Loffler, dated December 17, 1929, in which that plant is dealt with in detail. That plant does not form a part of the present invention and is, therefore, not claimed in the present application, but it is also described therein in such a measure that the invention can be fully understood.

On the drawing, 1 (Fig. 1) denotes the impeller of a steam circulation pump; 3 is the casing of this pump, and 2 the shaft to which said impeller 1 is affixed. This shaft passes through a bushing 6' located in a sleeve-like extension 3d of the pump casing 3. The shaft is provided with a comparatively large plurality of annular grooves 5 forming between them collars, and the bushing is provided with collars 6 engaging said grooves, these parts 5 and 6 together forming the labyrinth packing 4.

By providing the collars 6 in the separate bushing 6', the pump casing may be made in one piece and a two-piece pump casing which would otherwise be necessary can be avoided. This making the casing integral is valuable especially for high-pressure steam plants.

In the impeller 1 is an annular recess forming an annular chamber 7 which is arranged in series with the labyrinth packing 4, as shown in Fig. 1, and this chamber communicates with a bore 8 provided in the casing 3 and being fed with superheated steam introduced therein at $a$ (Figs. 1 and 2), the labyrinth packing operating, thus, not in connection with saturated steam, but with superheated steam.

The chamber 7 with its contents of superheated steam is separated from the pressure space of the casing 3 by an intermediate packing 9 also designed as a labyrinth packing and formed with the aid of a hollow or channel-shaped ring 3', the closed side of which is inserted into that wall of the casing adjacent the sleeve $3d$, whereas the open side of said channel ring is engaged by a pair of concentric rings carried by and projecting from the adjacent side of the impeller, the two sets of rings forming together an annular space or chamber 10 which communicates with the suction chamber of the pump through bores 11 provided in the body of the impeller. The intermediate packing 9 is between the main labyrinth packing 4 and chamber 10, and is formed between the respective rings nearest the shaft. Owing to the intermediate packing being designed in this manner, it can be short whereby the total length of the pump is reduced. Instead of the bores 11 a by-pass pipe leading from the inner space 10 of the ring 3' to the suction side of the pump may be provided. Between the space 10 of the intermediate packing and the clearance space 12 of the pump are annular grooves and rings engaging them which members together constitute also another labyrinth packing 13 acting in the same manner as the main labyrinth packing, and seals the annular chamber 10 from the clearance space 12 of the pump. Packing 13, and hence the length of all the packings, is short.

This main packing is, in the example shown, subdivided into three sections separated from one another by annular chambers 14 and 16 communicating with bores $b$ and $c$ of the sleeves 6' and $3d$. A part of the leakage steam is withdrawn at $b$ (Figs. 1 and 2), or 15 (Fig. 1) respectively, and is conducted to the corresponding stage of a two-stage or multi-stage steam-driven prime mover in order to do work, as will be more fully dealt with in connection with Fig. 2, that steam requiring no particular preliminary treatment in order to be suited for the object in view. The remainder of the leakage steam is withdrawn at $c$ (Figs. 1 and 2), or 17 (Fig. 1) respectively; its pressure is nearly atmospheric pressure and it can be utilized, for instance, for preheating the feed water for the plant, as is the case in the example shown in Fig. 2.

Referring to Fig. 2, in this example the leakage steam tapped at $b$ is conducted through pipes 21 and 26 to a turbine 18 that is coupled with the steam circulating pump 1, 3 in order to drive it. The waste steam from the turbine 18 is conducted through pipes 25 and 27 to a preheater 20 for the feed water; the preheater receives the water from a pump 28 through a pipe 29 and the hot water is then conducted through a pipe 30 into a coil 31 located in the flue 32 of a boiler 33; the preheated feed water is further and highly heated in said coil 31, and may be also evaporated, and the hot water or the steam or the mixture of both is conducted through a pipe 34 into the water space of a vessel 35, from the steam space of which extends a pipe 36 to the steam circulating pump 1, 3. The water in the vessel 35 which, in fact, is a steam generator, receives superheated steam from a coil 37 located in the top of the furnace of the boiler 33; below this coil is another coil 38 which is connected at one end with one end of the coil 37 by means of a pipe 39; the other end of the coil 38 is connected through a pipe 40 with the outlet bore of the pump 1, 3. The steam leaving the coil 38 is divided into two currents, the one flowing through a pipe 41 to the point $a$ (Fig. 2), that is to say, to the bore 8 of the pump casing 3 and further into the chamber 7 that is arranged in series with the labyrinth packing 4, or 5, 6 respectively, as has already been described. It will be understood that the quantity of steam which is used for sealing purposes is quite small in amount in comparison with the quantity of steam which passes from superheater 38 to superheater 37.

The highly superheated steam leaving the coil 37 is also divided into two currents, of which the one flows through the pipe 42 to the vessel or boiler 35 and is conducted directly into the water therein contained by means of a perforated pipe 43. The other current flows through a pipe 44 to the first stage $24a$ of a four-stage turbine; the second stage $24b$ and the third stage $24c$ are connected with one another not directly, but by the intermediary of an intermediate superheater 19. The steam flowing from the turbine stage $24b$ into this superheater is also divided into two currents, the one passing into this superheater and the other passing through a pipe 22 to the turbine 18 which receives also the leakage steam coming from the point $b$ (Fig. 2). Under small loads, leakage steam taken off at $b$ from the labyrinth packing is itself sufficient to drive turbine 18, so that in this case no steam is withdrawn from the main turbine for the turbine 18. At still smaller loads, so much steam may be available from the labyrinth packing in addition to that necessary for turbine 18, that steam may flow from the labyrinth packing to the main turbine between stages $b$ and $c$. The steam coming from the intermediate superheater 19 flows through the turbine stages $24c$ and $24d$ and the waste steam is condensed in a condenser 45 by means of a cooling pipe 46, the condensed steam flowing finally into a collecting vessel 47 from which it is further conducted into the feed water pump 28 already mentioned.

I wish it to be understood that the tapping points $b$ and $c$ may be located also at other portions of the labyrinth packing 4; that is true especially of the steam tapped at $b$, in that the respective portion of the labyrinth packing should be chosen in correspondence with the purpose for which the tapped steam is intended.

I wish it further to be understood that the labyrinth packing can be used also in connection with other arrangements and combinations of parts than such a one shown in Fig. 2. This is merely a constructional form shown by way of example.

Manifestly, the construction herein shown is capable of considerable modification and such modifications as come within the scope of my claims, I consider within the spirit of my invention.

I claim:

1. In a steam plant a working machine comprising a chamber to be sealed, containing saturated steam of superatmospheric pressure, especially high-pressure; a shaft passing into said chamber; a multistage labyrinth packing for sealing said shaft; a second chamber arranged between the labyrinth packing and the first chamber; a steam superheater; a conduit leading from the same to the said second chamber, whereby the latter may be supplied with superheated steam; a multistage steam engine and a direct connection between an intermediate stage of said labyrinth packing and an intermediate stage of said steam engine.

2. In a steam plant a working machine for high pressure saturated steam; a working chamber disposed within this machine; a shaft passing into said working chamber; a labyrinth packing for sealing the shaft; a second chamber arranged between the labyrinth packing and the said working chamber; a steam superheater; a connection from this superheater to the said second chamber, whereby this chamber is supplied with superheated steam; a low pressure power engine driving the working machine; an intermediate chamber arranged within the labyrinth packing and a direct connection between this intermediate chamber and the steam inlet into the said low pressure power engine driving the working machine.

3. In a steam plant a working machine for high pressure saturated steam; a working chamber situated within this machine; a shaft passing into said working machine; a labyrinth packing for sealing the said shaft; a second chamber between the labyrinth packing and the working chamber; a superheater; a connection between this superheater and the said second chamber, whereby the same is supplied with superheated steam; a low pressure prime mover driving the working machine; a conduit between the steam inlet into the latter and a low pressure steam line; an intermediate chamber arranged within the labyrinth packing of the working machine, the pressure in this intermediate chamber being controlled by the pressure at the steam inlet into the driving engine and a direct connection between this intermediate chamber and the steam inlet of the driving engine.

4. In a steam plant a multistage main power engine; a working machine; a working chamber arranged within this working machine; a shaft passing into this working chamber; an auxiliary low pressure power engine driving the working machine; a connection between an intermediate stage of the main engine and the steam inlet of the low pressure auxiliary engine; a labyrinth packing for sealing the shaft; a superheater; a second chamber arranged between the labyrinth packing and the said working chamber; a connection between the superheater and the said second chamber, whereby the latter is supplied with superheated steam; an intermediate chamber arranged within the labyrinth packing of the working machine, having about the same pressure as the said intermediate stage of the main engine and a direct connection between this intermediate chamber and the steam inlet of the auxiliary power engine.

WILHELM BEYER.